(12) United States Patent
Herzog et al.

(10) Patent No.: US 10,536,995 B2
(45) Date of Patent: Jan. 14, 2020

(54) INDUCTION HEATING ARRANGEMENT AND INDUCTION HOB

(71) Applicant: Electrolux Appliances Aktiebolag, Stockholm (SE)

(72) Inventors: Michael Herzog, Rothenburg ob der Tauber (DE); Marco Saporetti, Forli (IT); Jurgen Leikam, Rothenburg ob der Tauber (DE)

(73) Assignee: Electrolux Appliances Aktibolag, Stockholm (SE)

( * ) Notice: Subject to any disclaimer, the term of this patent is extended or adjusted under 35 U.S.C. 154(b) by 446 days.

(21) Appl. No.: 15/322,247

(22) PCT Filed: Jul. 16, 2015

(86) PCT No.: PCT/EP2015/066309
§ 371 (c)(1),
(2) Date: Dec. 27, 2016

(87) PCT Pub. No.: WO2016/030079
PCT Pub. Date: Mar. 3, 2016

(65) Prior Publication Data
US 2017/0156180 A1    Jun. 1, 2017

(30) Foreign Application Priority Data

Aug. 26, 2014   (EP) .................................... 14182298
Aug. 26, 2014   (EP) .................................... 14182299

(51) Int. Cl.
*H05B 6/12*     (2006.01)
*H05B 6/06*     (2006.01)

(52) U.S. Cl.
CPC .......... *H05B 6/1272* (2013.01); *H05B 6/062* (2013.01); *H05B 6/065* (2013.01); *H05B 6/1254* (2013.01);
(Continued)

(58) Field of Classification Search
CPC .... H05B 6/062; H05B 6/1254; H05B 6/1272; H05B 6/065; H05B 2206/022; Y02B 40/126
(Continued)

(56) References Cited

U.S. PATENT DOCUMENTS 4,792,652 A   12/1988   Seguy
8,350,194 B2  1/2013    Lee et al.
(Continued)

FOREIGN PATENT DOCUMENTS

DE   102009019765 A1   11/2010
EP       2170010 A2    3/2010
(Continued)

OTHER PUBLICATIONS

International Search Report & Written Opinion issued in corresponding PCT Application No. PCT/EP2015/066309 dated Oct. 28, 2015, 12 pages.
(Continued)

*Primary Examiner* — Quang T Van
(74) *Attorney, Agent, or Firm* — Pearne & Gordon LLP

(57) ABSTRACT

An induction heating arrangement (1000) including four coils of a smaller diameter (1100, . . . , 1400) and a coil having a larger diameter (1500) is provided. The coils are arranged on a first plane (2100) and on a second plane (2200). In order to adapt a cooking area (1600) to the size of a pot, either the larger coil (1500) or one or more of the smaller coils (1100, 1400) are operated. A power supply circuitry (2400) is shared between the coils of the two planes. A selector (2300) disconnects a respective coil of the plane of coils that is not operated in order to avoid coupling, interference and loss of energy. Guiding elements of the magnetic flux (1110, 1115, 1540) confine the magnetic field
(Continued)

Figure 6:
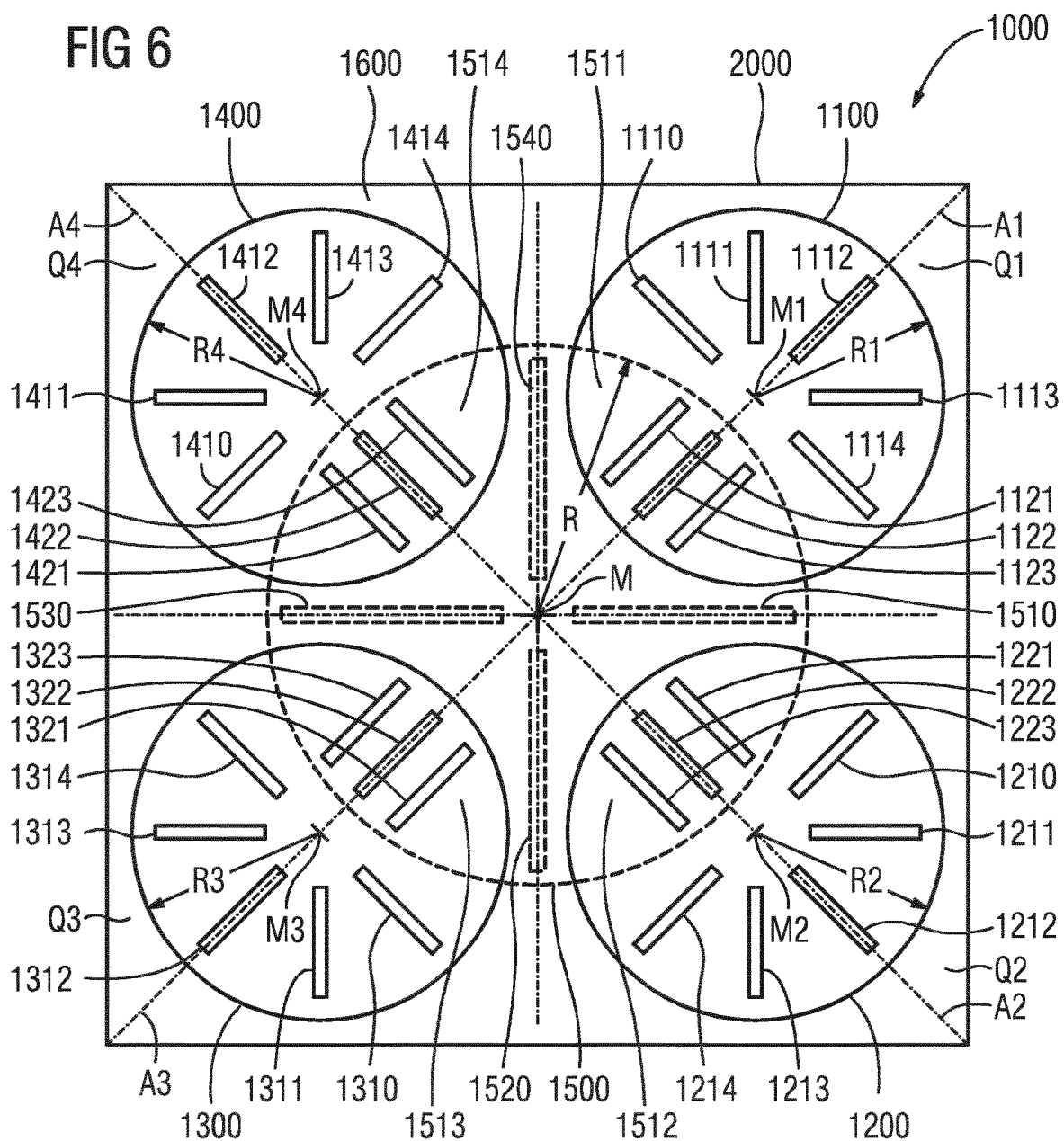

in the area of the pot. A method of operating the induction heating arrangement is also provided.

22 Claims, 5 Drawing Sheets

(52) U.S. Cl.
    CPC ....... *H05B 2206/022* (2013.01); *Y02B 40/126* (2013.01)

(58) Field of Classification Search
    USPC ........ 219/620–622, 624–626, 660–667, 671, 219/672
    See application file for complete search history.

(56) References Cited

U.S. PATENT DOCUMENTS

| | | | |
|---|---|---|---|
| 8,791,398 | B2 | 7/2014 | De la Cuerda Ortin |
| 8,878,108 | B2 | 11/2014 | Kataizumi et al. |
| 9,277,598 | B2 | 3/2016 | Lee et al. |
| 2010/0061753 | A1* | 3/2010 | Hase ................. G03G 15/2042 399/69 |
| 2011/0100980 | A1 | 5/2011 | Kitaizumi et al. |
| 2017/0156180 | A1 | 6/2017 | Herzog et al. |

FOREIGN PATENT DOCUMENTS

| | | | |
|---|---|---|---|
| EP | 2265088 | B1 | 12/2010 |
| EP | 2405715 | A1 | 1/2012 |
| JP | 2005302406 | A | 10/2005 |
| JP | 2015028908 | A * | 2/2015 |
| WO | 2011067708 | A1 | 6/2011 |

OTHER PUBLICATIONS

International Search Report and Written Opinion issued in PCT Application No. PCT/EP2015/066307 dated Nov. 12, 2015, 10 pages.

\* cited by examiner

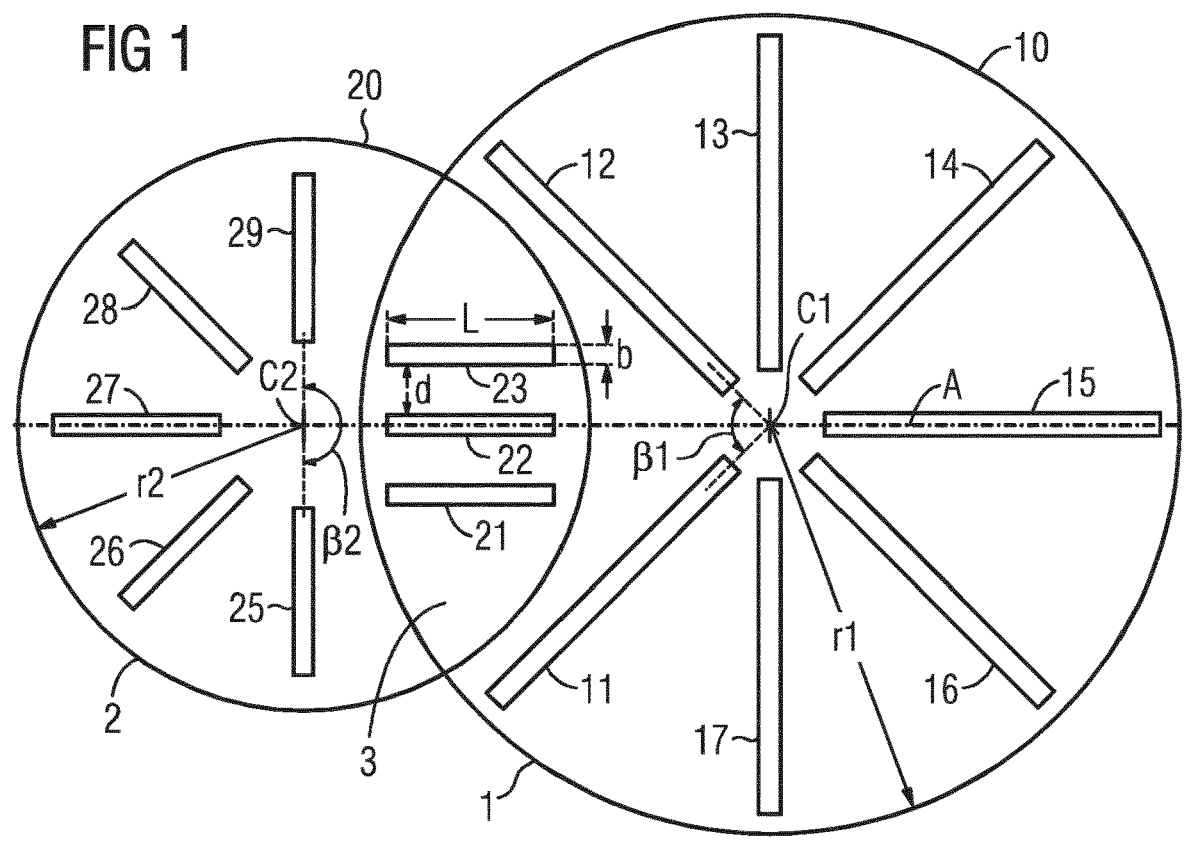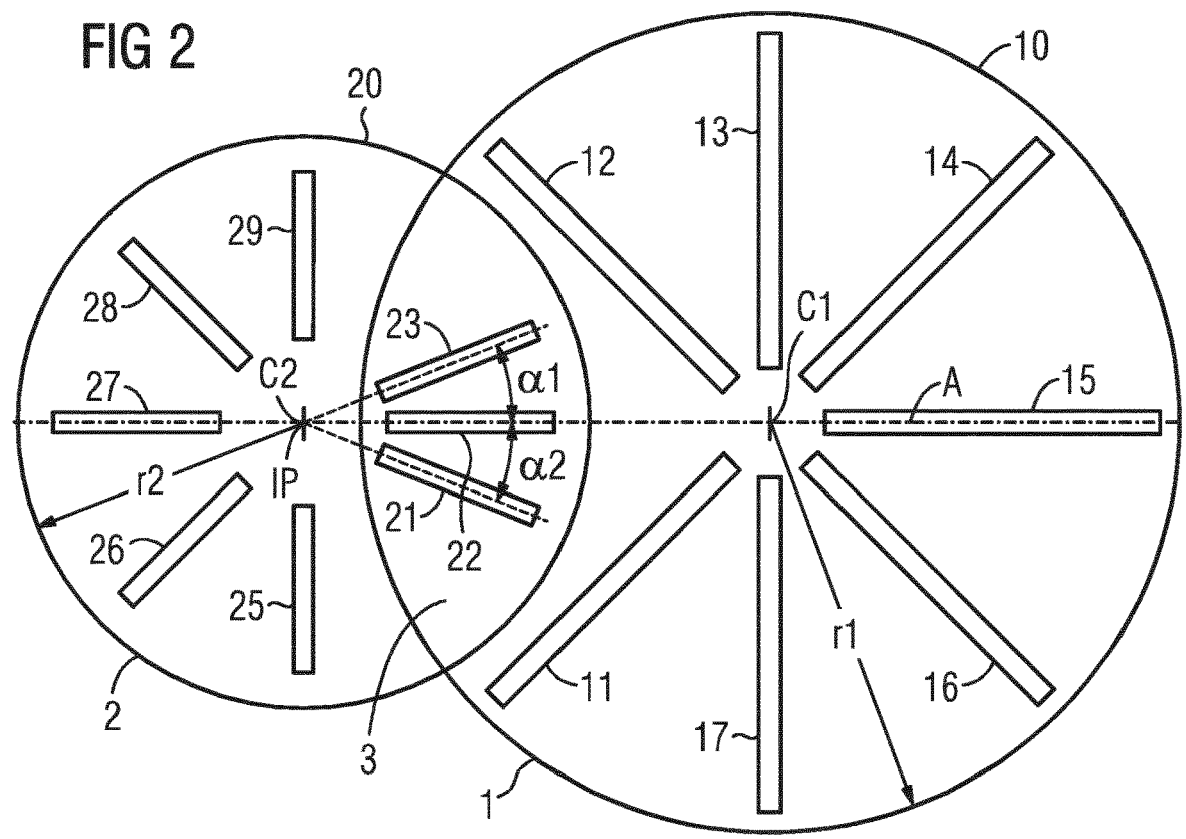

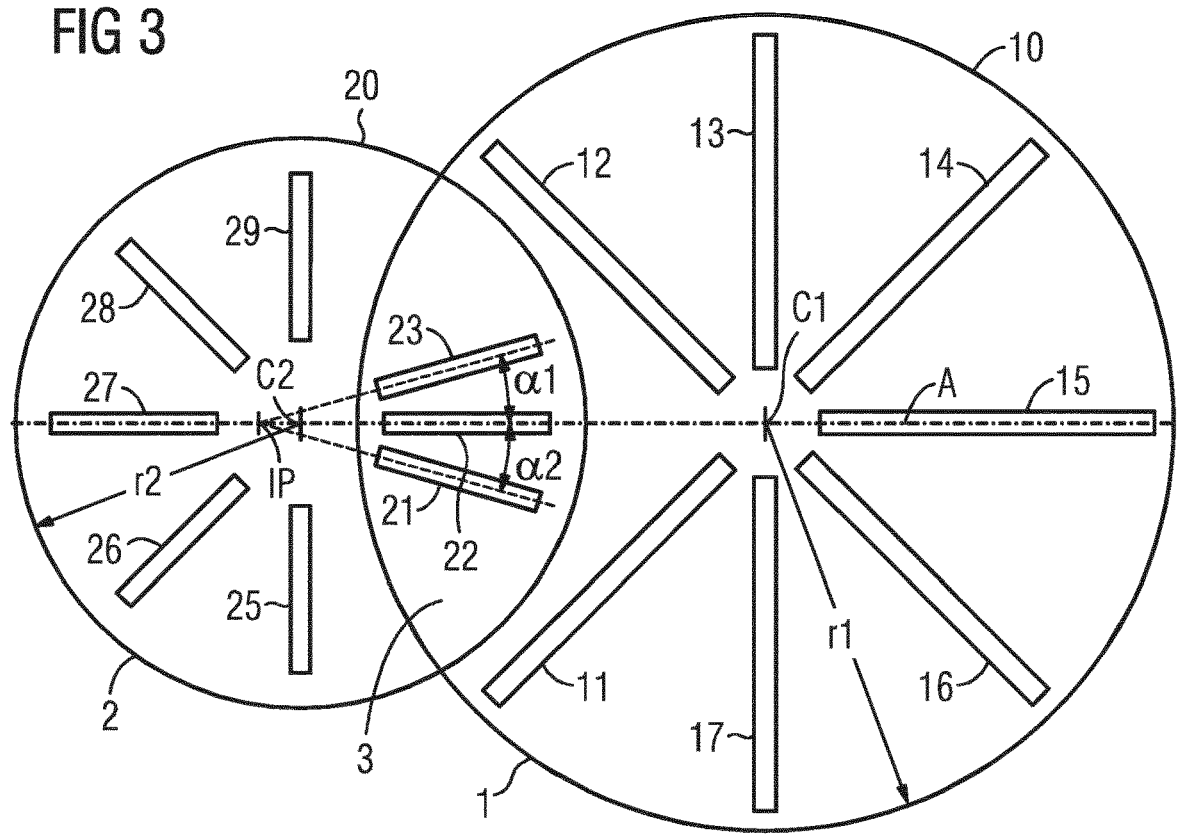
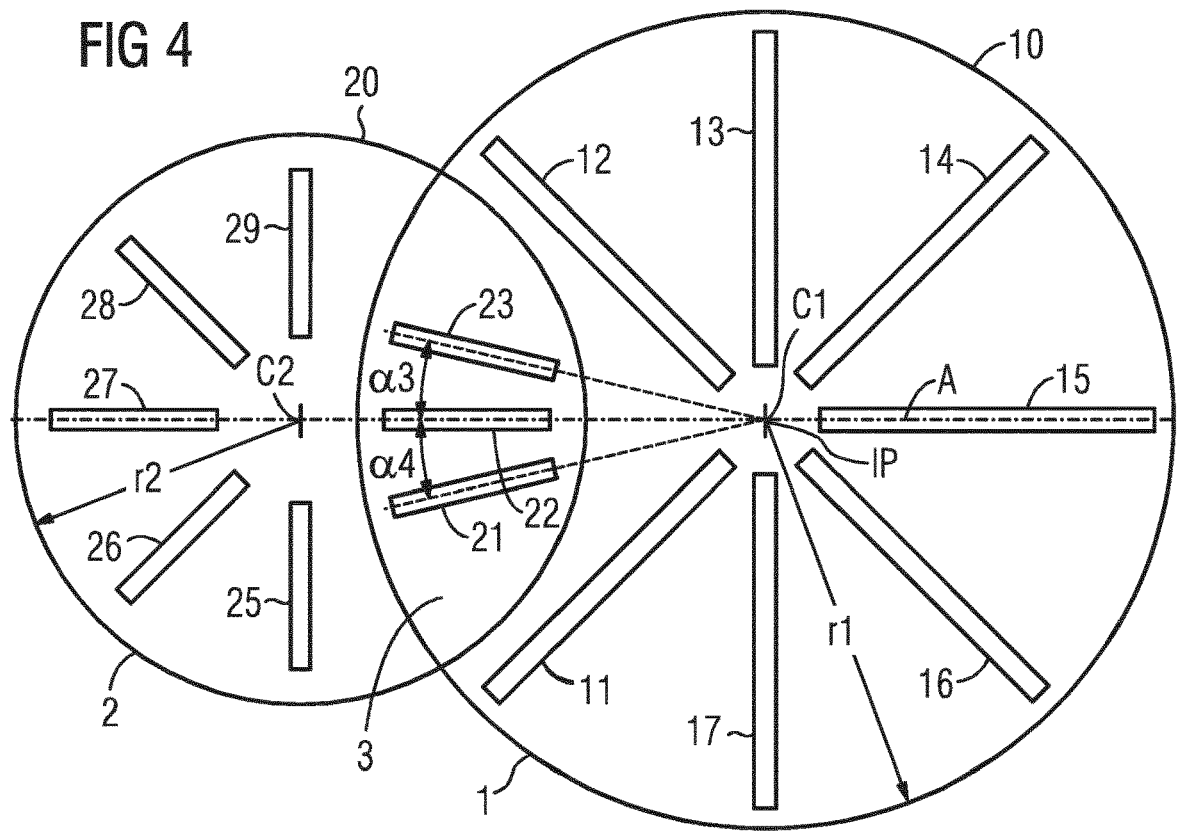

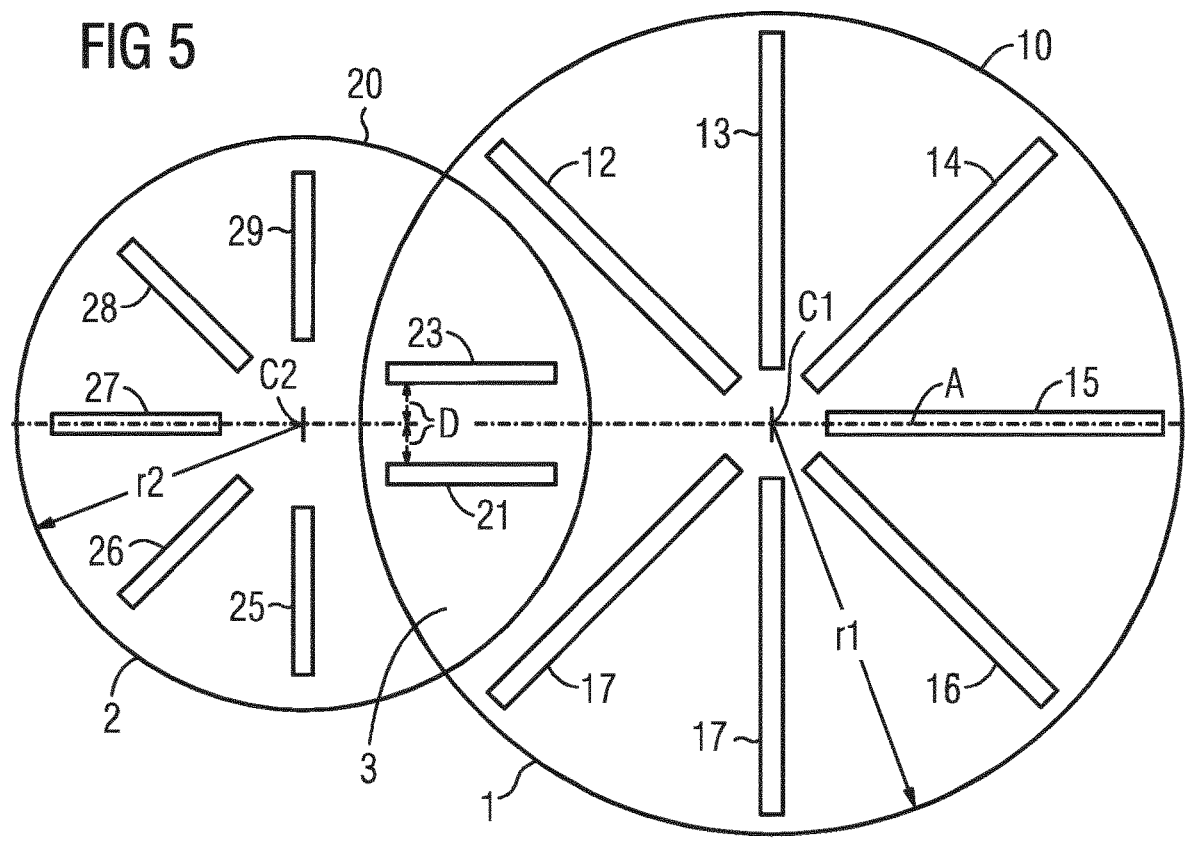

INDUCTION HEATING ARRANGEMENT AND INDUCTION HOB

The invention relates to an induction heating arrangement and an induction cooking hob.

In modern household environments, such as kitchen environments, a reason to buy new household appliances is better usability, energy efficiency and a more flexible use of the devices. Thus, the technical focus on developments in this area is directed to improvements regarding usability, energy efficiency and flexibility of the devices.

In the area of cooking hobs, induction heating has become widely available in recent years. A general problem with induction heaters is, however, that the induction coils are located underneath a plate, e.g. a glass ceramic plate and that it is generally difficult to align pots or cooking vessels in general of different sizes exactly to the field of an induction coil in order to maximize the energy transfer from the high-frequency electromagnetic field into the metallic pot.

On the other hand, there are plenty of pots with different shapes, e.g. for fish or for roasts, that widely extend over the area of traditional circular heaters.

There is thus a need with induction hobs to be able to flexibly adapt to a pot size and/or to a pot position of a pot on a surface or top plate of an induction kitchen hob.

Further, there is a need to save as much energy as possible because energy is a costly resource and fossil energy is only limited.

DE 10 2009 019 765 A1 discloses an induction heating arrangement for a grill with several induction coils being arranged under a plate. In one embodiment (FIG. 5) a central first induction coil is surrounded symmetrically by three second induction coils having a smaller diameter than the first induction coil. The first coil and the second coils are operated at the same time to provide a homogeneous induction field and uniform heating for the grill placed upon the plate. Magnetic flux guiding elements are provided in the grill but not described in the coils.

In EP 2 265 088 B1 it is disclosed to use an array of circular induction coils arranged in two different layers whereby the arrays in the different layers are horizontally displaced against each other to improve induction power coverage in the cooking field. Depending on the position of a pot on the induction cooking area, induction coils beneath the pot of either one or the other layer are used. In order to avoid interference between the induction coils of the different layers, only coils of one layer are used at a time, which also allows it to reduce the number of power supplies required for the operation of the induction cooking field. All coils are preferably of the same diameter. Six magnetic flux guiding elements made of ferrite material are provided for each induction coil radially extending from a centre of the coil outwardly almost over the complete radius of the coil. In the overlapping regions where two coils overlap the two coils have exactly one guiding element in common which extends on and along an axis that runs in a radial direction of each of the the overlapping coils. Three guiding elements form equilateral triangles.

The invention is based on the problem to provide induction heating with at least two overlapping induction coils and efficient guiding of the magnetic flux.

In an embodiment of the invention the induction heating arrangement comprises at least one first induction coil and at least one second induction coil, the second induction coil partially overlapping with the first induction coil in an overlapping region.

Outside of the overlapping region the first induction coil and the second induction coil are each provided with several respective guiding elements for guiding magnetic flux of the respective induction coil.

Inside or within the overlapping region at least two further guiding elements are arranged for guiding the magnetic flux of the first induction coil and/or of the second induction coil. At least a first one of these further guiding elements is spaced apart from an axis (radial axis) running in a radial direction of the first induction coil as well as in a radial direction of the second induction coil, in particular running through both respective centres of both overlapping induction coils, and is oriented or arranged either parallel to said axis or inclined to said axis.

By means of this specific arrangement of the magnetic flux guiding elements according to the invention magnetic field or flux lines can be guided and concentrated, in particular to the area where they are needed for heating and thus the energy efficiency is increased, as more of the magnetic field lines enter an object such as pot to be heated. In other words the guiding elements for the magnetic flux further improve the concentration of the magnetic field lines and thus the energy transfer capability of the induction heating arrangement and help to improve the magnetic field distribution of the induction heating arrangement which can in particular be fine-tuned and be maintained homogeneous.

In a preferred embodiment at least a second one of the further guiding elements provided in the overlapping region extends on and along said axis (radial axis).

In an advantageous embodiment exactly three further guiding elements are provided in the overlapping region two first ones of these three further guiding elements being arranged spaced apart from said axis and parallel or inclined to said axis and preferably on opposite sides of said axis, and one second one of the three further guiding elements in the overlapping region extending on and along said axis and/or being arranged in between or in the middle of the two first further guiding elements.

In another embodiment exactly two further guiding elements are provided in the overlapping region both being arranged spaced apart from and parallel or inclined to said axis, preferably on opposite sides of said axis.

A further embodiment comprises two first further guiding elements within the overlapping region being inclined at a respective inclination angle to said axis, preferably in opposite inclination directions, i.e. one clockwise and one anti-clockwise. Preferably longitudinal axes of the two first guiding elements or the legs of their inclination angles intersect said radial axis at a respective, in particular the same, point of intersection which lies on the same side of the orthogonal projection of the respective guiding element onto said axis as a centre of either the first induction coil or the second induction coil and spaced apart from said centre. Preferably the intersection point is positioned at a larger distance from said orthogonal projection than said centre resulting in particular in an inclination somewhat between parallel and radial direction.

The individual guiding elements outside of the overlapping region extend in a respective radial direction of the respective first induction coil or second induction coil which results in an advantageous and homogeneous magnetic flux guidance.

In an embodiment also at least one first further guiding element inside the overlapping region which is inclined to said axis, extends in a radial direction of the first induction coil or the second induction coil to further improve the guiding of the magnetic flux of that coil.

In a preferred embodiment the further guiding elements in the overlapping region are arranged symmetrically to said axis.

The guiding elements are preferably arranged or attached below or at the underside of the respective induction coil.

The induction heating arrangement may further comprise a support plate for an object to be heated such as a cooking vessel or cooking good carrier, wherein preferably the first induction coil is arranged on, in particular applied thereonto as a structured layer or as a pre-manufactured part, a lower surface of the support plate and wherein preferably the second induction coil(s) is/are arranged further below the plate, in particular attached or arranged at a lower surface of the first induction coil.

According to another embodiment of the invention an induction heating arrangement, may comprise:
- the first induction coil having a first diameter and being arranged in a first plane;
- at least one, preferably two, three or four, second induction coils having at least one second diameter and being arranged in a second plane, wherein each second diameter is smaller than the first diameter, i.e. the first induction coil has a larger diameter than each of the second coils;
- the second induction coils being arranged around (or: encircling or surrounding) the first induction coil or, in other words, the first induction coil being arranged in a centre of the arrangement of the second induction coils, and each of the second induction coils partially overlapping with the first induction coil.

A coil being "arranged in a plane" is to be interpreted in such a way that the coil extends along that plane with the plane passing through the coil. Of course the coil is a three-dimensional technical object and not two-dimensional like a geometrical plane. The expression "in a first (second) plane" could also be replaced in all claims and embodiments by "at a first (second) height" or by "on a respective first (second) level".

The diameter of the coil can be defined as the largest distance between two boundary points of the coil, e.g. in case of a circular coil twice the radius and in case of a square coil the length of the diagonal.

In a further embodiment centres of all second induction coils lie outside of the first induction coil and/or outside of the overlapping regions. Preferably each overlapping region comprises less than 50% and/or less than 180° angular sector of the corresponding second induction coil.

The induction heating arrangement may advantageously be further improved so that at least two, in particular all, second induction coils have the same diameter and/or size and/or wherein at least one, preferably all, of the induction coils is or are of circular shape and/or wherein at least four second induction coils are provided each being arranged in a corresponding quadrant of a rectangular or square shaped heating area defining heating zones and the first induction coil is arranged around a centre of the heating area extending into each of the quadrants and defining another central heating zone.

Beneficially, according to a further embodiment of the induction heating arrangement according to the present invention, the length of a guiding element for the magnetic flux corresponds to the expansion of a respective induction coil. In this manner, the magnetic field distribution across the induction heating arrangement can be further optimized and tailored according to the need in current kitchen appliances. Also, it can be further optimized in terms of avoiding interference between the corresponding induction coils.

According to a further embodiment of the induction heating arrangement according to the present invention, the induction coil having a larger diameter may comprise guiding elements for the magnetic flux having a different, in particular greater, length. In this manner, the extension of the larger induction coil can be optimally exploited, while at the same time guiding elements for the magnetic flux can be used that are part of the induction coils having a smaller diameter in an area of overlap to focus the magnetic field and homogenize the magnetic field distribution over the induction coil having a larger diameter.

In particular, according to a further embodiment of the induction heating arrangement according to the present invention, the guiding elements for the magnetic flux associated to the induction coil with a larger diameter are arranged outside the area of the induction coils having a smaller diameter. In this manner, the induction coils having a smaller diameter can be shielded against each other, and the magnetic field lines associated to the respective induction coils having a smaller diameter can be concentrated further in the area of the respective smaller induction coils. In this manner, the energy efficiency is further increased and the magnetic field lines are further concentrated in the area where the pot is supposed to be as in traditional heating zones.

Advantageously, according to a further embodiment of the induction heating arrangement according to the present invention, the guiding element for the magnetic flux is made of a ferrite, as ferrite is a material widely available and suitable to guiding element magnetic field lines in household appliances in a particular manner.

In another embodiment of the invention an induction heating arrangement may comprise further a selector or control device configured to operate, including to electrically connect to a power supply, either, in a first operational state, the first induction coil, while not operating, preferably electrically disconnecting, any of the second induction coils or, in a second operational state, to operate, including to electrically connect to a power supply, at least one of the second induction coils while not operating, preferably electrically disconnecting, the first induction coil.

The selector or control device in particular selects or operates only the first induction coil or at least one of the second coils but not the first induction coil together with one or more of the second induction coils.

By the technical measures described the induction heating arrangement can be used for differently sized objects, in particular pans or pots, objects with larger diameter on the first coil and, also several, objects with smaller diameter on the second induction coils but there is still a saving in power and energy consumption and a good efficiency as the overlapping coils will not be operated at the same time and thus electromagnetic losses avoided.

The electromagnetic losses by induced currents are in particular reduced in the preferred embodiment where the coil(s) not operated are electrically disconnected in the respective operational state so that no induced current can flow in or out of the non-operated coil(s).

Each induction coil may define a respective heating zone for an object, in particular a cooking vessel or cooking good carrier, which is usually placed on a support plate or surface above the coil.

Advantageously, the induction heating arrangement according to an embodiment of the present invention combines a larger coil in one plane with at least two, preferably four, smaller coils in another plane. In this manner, a traditional hob configuration having four cooking zones can be constructed while at the same time a larger pot can be accommodated by a larger induction coil.

Beneficially, electromagnetical interference is prevented by disconnecting the coils of one plane by means of the selector which maximizes the energy efficiency and at the same time reduces the maximum number of power supply circuitries. In one embodiment the induction heating arrangement comprises at least one power supply for the induction coils, being controlled by the selector or control device, wherein the selector or control device, in the first operational state, electrically connects the first induction coil and electrically disconnects all second induction coils to or from the respective power supply and, in the second operational state, electrically connects at least one of the second induction coils and electrically disconnects the first induction coil to or from the respective power supply. That way an electrical current induced by the operated coil cannot flow in or out the disconnected coil and thus energy losses are further reduced. Preferably the number of power supplies is smaller than the number of induction coils.

In an advantageous embodiment centres or centre points of all second induction coils lie outside of the first induction coil and/or outside of the overlapping regions. Furthermore, preferably each overlapping region comprises less than 50% and/or less than 180° angular sector of the corresponding second induction coil. This allows for the remaining larger section of the coils to be constructed in a conventional way and in particular equipped with magnetic flux guiding elements.

Preferably at least two, in particular all, second induction coils have the same diameter.

Preferably all induction coils are of circular shape, but other shapes like oval or ellipsoidal or polygonal (e.g. triangular, rectangular, hexagonal) shapes are also possible.

In a preferred embodiment, being in particular suitable for a conventional cooking hob, at least four second induction coils are provided each being arranged in a corresponding quadrant of a rectangular or square shaped heating area defining heating zones. The first induction coil is then arranged around a centre of the heating area and extends into each of the quadrants and defines another, central heating zone.

Beneficially, according to a further embodiment of the induction heating arrangement according to the present invention, it is equipped with a power supply circuitry, wherein the power supply circuitry can serve induction coils on one plane and equally a larger induction coil on another plane. Thus, the number of power supply circuitry required in this induction heating arrangement is less than the number of induction coils used depending on the number of coils allocated to the different planes.

Beneficially, according to a further embodiment of the induction heating arrangement according to the present invention, the number of power supply circuitry is lower than the number of induction coils used in the induction heating arrangement, whereas by use of the selector, the induction coils of one plane are disconnected and thus require no power supply circuitry. A lower number of circuits improves the reliability and facilitates the manufacturing of the induction heating arrangement, as lesser parts require less manufacturing effort and entail lower costs.

The selector or control device is preferably coupled to a user input selecting device, comprising any kind of actuating or interacting element(s) such as rotary or pushing or sliding knobs or buttons or switches or touch elements or touch screens etc. to select the first induction coil and respective heating zone or one or more of the second induction coils or heating zones, in particular separately or individually.

The induction heating arrangement may comprise a support plate with a support surface for placing an object to be heated such as a cooking vessel or cooking good carrier.

The first induction coil may be arranged on a lower surface of the support plate facing away from the support surface and in particular applied thereonto as a structured layer or, e.g. g by gluing, as a pre-manufactured part.

Preferably the second induction coils are arranged further below the plate than the first induction coil, in particular attached or arranged at a lower surface of the first induction coil.

The guiding elements in each overlapping region may be fixed to the corresponding second induction coil, preferably at a lower side or surface facing away from the first induction coil and/or the support plate.

The guiding elements outside of the overlapping regions may be fixed, e.g. glued, to the respective induction coil, esp. at its underside.

Beneficially, according to a further embodiment of the induction heating arrangement according to the present invention, this is arranged beneath a pot support or hob plate, wherein the induction coil having a larger diameter is arranged on the pot support. In this manner, parts are saved and the distance to the cooking area is as short as possible.

Beneficially, an induction cooking hob according to the present invention comprises an induction heating arrangement according to the present invention, because in this manner a flexible reliable and power-saving induction hob can be realized that is attractive for a potential customer.

Figure 7:
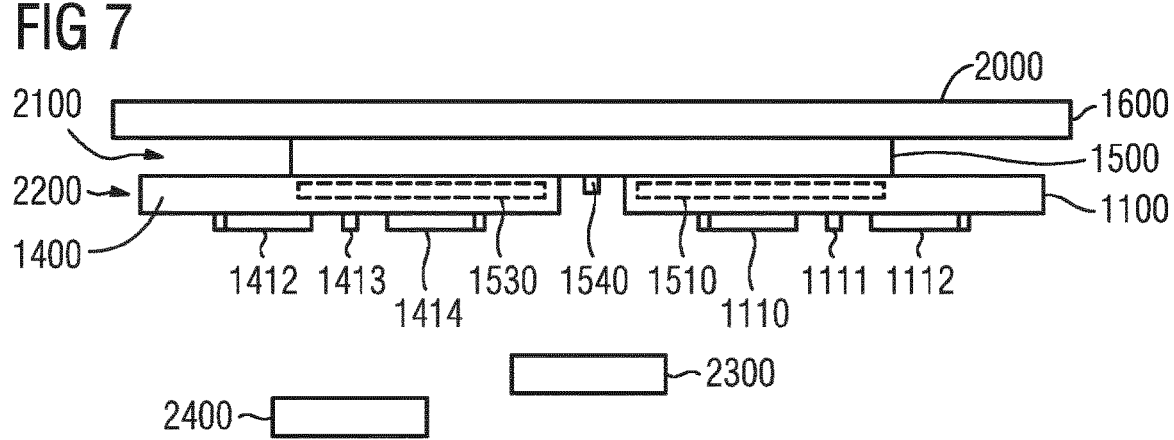
Figure 8:
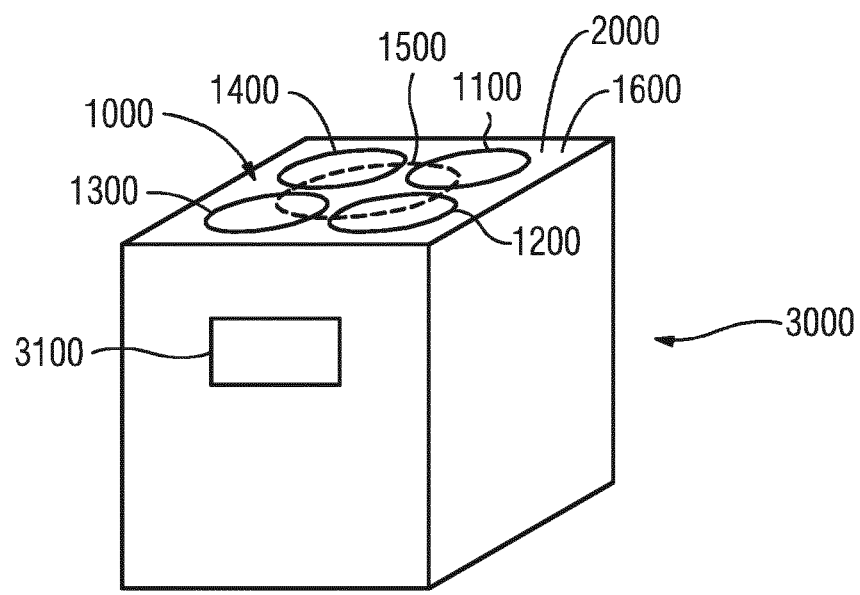
Figure 9:
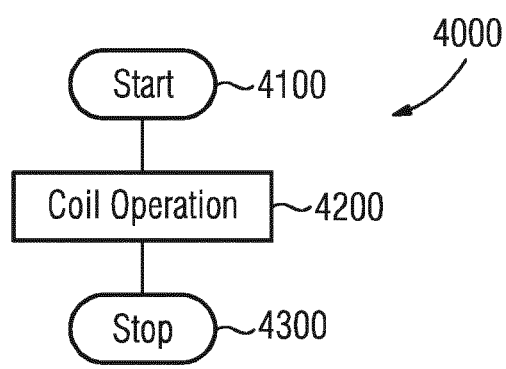

The invention will in the following be explained further on the basis of examples shown in drawings, wherein:

FIG. 1 depicts an induction heating arrangement having two overlapping induction coils according to an embodiment of the present invention, FIG. 2 shows an induction heating arrangement having two overlapping induction coils according to another embodiment of the present invention, FIG. 3 illustrates an induction heating arrangement having two overlapping induction coils according to yet another embodiment of the present invention, FIG. 4 depicts an induction heating arrangement having two overlapping induction coils according to a further embodiment of the present invention, FIG. 5 shows an induction heating arrangement having two overlapping induction coils according to another embodiment of the present invention, FIG. 6 shows an induction heating arrangement, in particular for an induction cooking hob, having five induction coils according to a further embodiment of the present invention, FIG. 7 shows a side view of an induction heating arrangement of FIG. 6, FIG. 8 depicts an induction hob according to an embodiment of the present invention and FIG. 9 illustrates a method for operating an induction heating arrangement.

In the embodiments shown in FIG. 1 to FIG. 5 a first induction coil 1 having a centre C1 and a radius r1 and an outer circular edge or rim 10 and a second induction coil 2 having a centre C2 and a radius r2 and an outer circular edge or rim 20 are provided. The centres C1 and C2 lie on a common axis A which is drawn as a horizontal axis the position, however, is not important. The radius r1 of the first induction coil 1 is larger than the radius r2 of the second induction coil 2, in particular so that r2<r1<2·r2, which means that the first induction coil 1 is greater than the second induction coil 2.

The two induction coils 1 and 2 overlap in an overlapping region 3 enclosed by their two intersecting rims 10 and 20 wherein the distance between the two centres C1 and C2 along the axis A is chosen to be greater than r1 but smaller than r1+r2 and preferably smaller than 2·r1.

Each one of the induction coils 1 and 2 can be operated separately by supplying the individual induction coil 1 or 2 with a corresponding electric alternating or time variable current, in particular of high frequency, to generate, by electromagnetic induction, a magnetic induction field around the induction coil 1 or 2 which follows the changes of the electric current in the induction coil 1 or 2 in time. This induction field is then used to inductively heat an object, in particular cooking vessel, placed within the induction field of the induction coil 1 or 2, in particular above the induction coil 1 or 2, in a per se known manner. This arrangement of at least two overlapping induction coils 1 and 2 allows for a variable heating zone or adaption to different sizes of objects to be heated as either the smaller coil 2 or the larger coil 1 or, if required, even the combination of coils 1 and 2 can be operated.

The magnetic flux or field of the induction coils 1 and 2 when operated needs to be guided. This is achieved by magnetically conducting guiding elements which concentrate and guide the magnetic flux or field lines and avoid too large losses of energy.

Therefore, as a first measure, outside of the overlapping region 3, each induction coil 1 and 2 is provided with respective flux guiding elements for guiding the magnetic flux when a magnetic induction field is generated by the induction coils 1 and/or 2.

The guiding elements are in particular formed as rods or longitudinally or linearly extending elements made of magnetic material and preferably arranged, with their longitudinal axis or linear direction radially or in a radial direction with respect to the respective centre C1 or C2 of the respective induction coil 1 or 2. Each line going through the centre C1 or C2 or along a radius r1 or r2 defines a radial direction for the respective coil 1 or 2. The length of each guiding element in radial direction is advantageously chosen to be above 50%, preferably at least 60% or even 80%, of the radius r1 or r2 of the respective coil 1 or 2 to provide a uniform guidance for the magnetic flux.

In the embodiments shown in FIGS. 1 to 4 there are for example seven guiding elements 11, 12, 13, 14, 15, 16 and 17 of the first induction coil 1 and five guiding elements 25, 26, 27, 28 and 29 of the second induction coil 2. In each case one guiding element, 15 of the first induction coil 1 and 27 of the second induction coil 2, is arranged on the axis A, and two guiding elements, 13 and 17 of the first induction coil 1 and 27 and 29 of the second induction coil 2, are arranged orthogonally or in a direction perpendicular to the axis A diametrically opposed or on opposite sides of the respective centre C1 or C2. The guiding element 14 is arranged in between the guiding elements 13 and 15 and the guiding element 16 in between the guiding elements 15 and 17, preferably in each case in the middle or at an angle of 45°. The guiding element 11 is arranged diametrically opposed to the guiding element 14 with respect to the centre C1 and the guiding element 12 is arranged diametrically opposed to the guiding element 16 with respect to the centre C1. The guiding element 26 is arranged in between the guiding elements 25 and 27 and the guiding element 28 in between the guiding elements 27 and 29, preferably in each case in the middle or at an intermediate angle of 45°. The included angle β1 between the guiding elements 11 and 12 of the first induction coil 1 adjacent to the overlapping region 3 is therefore 90° in these exemplary embodiments but can also be different, in particular in between 80° and 110°. The included angle β2 between the guiding elements 25 and 29 of the second induction coil 2 adjacent to the overlapping region 3 is 180° in these exemplary embodiments but can also be different, in particular in between 90° and 180°.

The radius r2 and the rim 20 of the second induction coil 2 or the overlapping region 3 is chosen to fit into the intermediate angle β1 in between the two guiding elements 11 and 12 preferably at a rather short distance. The radius r1 and the rim 10 of the second induction coil 1 or the overlapping region 3 is also chosen to fit into the intermediate angle β2 in between the two guiding elements 25 and 29 preferably at a rather short distance.

There may also be more than than just one second induction coil overlapping with the first induction coil 1 for instance in between the guiding elements 12 and 14 or 14 and 16 or 16 and 18 thereby replacing or omitting the intermediate guiding element 13 or 15 or 17 respectively.

Now, as an additional measure according to the invention, inside the (or each) overlapping region 3 at least two respective further guiding elements, e.g. 21 and 23, or preferably at least three further guiding elements, e.g. 21, 22 and 23, are provided which are shared by both induction coils 1 and 2 or which guide the magnetic flux of each induction coil 1 and 2 during its respective operation.

In the embodiments of FIG. 1, FIG. 2, FIG. 3 and FIG. 4 there are three guiding elements 21, 22 and 23 and in the embodiment of FIG. 5 there are two guiding elements 21 and 23 arranged in the overlapping region 3. More than three guiding elements are also possible.

In FIGS. 1 to 4 the guiding element 22 is arranged on or along the axis A, and thus radially with respect to the centres C1 and C2 of both induction coils 1 and 2. This is the in many respects optimal position for a magnetic flux guiding element as it has a radial orientation for both coils which leads to a preferred magnetic flux conduction and influence on the flux or field lines in radial direction for both coils.

Furthermore, in FIGS. 1, 2, 3 and 4 there are provided two further guiding elements 21 and 23 within the overlapping region 3 arranged at a distance or spaced apart from or displaced from the axis A. The guiding element 22 is preferably arranged in the middle of or in between the two guiding elements 21 and 23. Preferably, the two guiding elements 21 and 23 are arranged symmetrically with each other with respect to the axis A or with respect to the guiding element 22.

The further guiding elements 21 and 23 in addition to the generic guiding element 22 increase the magnetic conductivity and guidance for the magnetic flux in the overlapping region 3 and allow for an increase in the area of the overlapping region 3 without losing too much homogeneity of the magnetic flux or field, although they cannot be arranged radially with respect to both coils 1 and 2 at the same time. The design and orientation and position of the further guiding elements 21 and 23 with respect to the axis A or guiding element 22 may be varied and adapted to a preferred magnetic flux lines distribution in case of individual operation of each of the coils 1 and 2 or also in case of a common operation of both coils 1 and 2 if required.

In FIG. 1 the two guiding elements 21 and 23 are oriented in parallel to the axis A at a predetermined, preferably the same, distance d from the guiding element 22 which distance d can be varied within the shape of the overlapping region 3 but is usually smaller than the length L of at least one of the guiding elements 21, 22 and 23 and larger than their width w.

In this embodiment the guiding elements 21, 22 and 23 are of the same length L and same width w but of course they may have different lengths and widths, e.g. the middle element 22 have a larger length and width than the two outer elements 21 and 23.

This parallel arrangement provides for an averaging of the magnetic flux in between the radial directions of both induction coils 1 and 2.

In FIGS. 2 and 3 the two outer guiding elements 21 and 23 are oriented at a respective inclination angle $\alpha 1$ or $\alpha 2$ to the axis A, wherein preferably $\alpha 1 = \alpha 2$, but with opposite inclination direction (clockwise and anticlockwise). The inclination is chosen such that the longitudinal axes of the guiding elements 21 and 23 or the legs of the inclination angles $\alpha 1$ and $\alpha 2$ intersect the axis A at a point of intersection IP which is on the same side of the orthogonal projection of the respective guiding element 21 or 23 onto the axis A as the centre C2 of the second induction coil 2, in FIGS. 2 and 3 on the left towards, at or behind the centre C2, whereas the centre C1 of the first induction coil 1 is on the opposite side of said projection.

If the point of intersection IP is in or coincides with the centre C2 this results in a radial orientation also of the guiding elements 21 and 23 with respect to C2. Such an embodiment is shown in FIG. 2, the inclinations are chosen in such a way that the two guiding elements 21 and 23 are arranged radially with respect to the centre C2 of the second induction coil 2. This type of arrangement with the guiding elements 21 and 23 inclined as shown e.g in FIG. 2 and described leads to an optimisation of the magnetic flux of the second induction coil 2, but is not optimal for the first induction coil 1. Nevertheless, this is in particular advantageous if there are more than one second induction coils 2 overlapping with the same first induction coil 1, such as e.g. shown in FIG. 6 for e.g. four second induction coils, where the optimisation of four coils is preferred over the optimisation of just one coil.

However an inclination deviating from a radial direction with respect to C2 may also be advantageous.

As shown for example in FIG. 3 the point of intersection IP on the axis A may also be on the opposite side of the centre C2 than the projection of the guiding element 21 or 23 onto the axis A and the inclination thus will be less steep than a radial direction and with decreasing inclination angles $\alpha 1$ and $\alpha 2$ (with the point of intersection IP moving further outwardly) become closer to a parallel orientation as shown in FIG. 1 and the flux guidance will be more averaged between the two coils 1 and 2.

If the point of intersection IP on the axis A is on the same side of the centre C2 as the projection of the guiding element 21 or 23 onto the axis A (not shown) the inclination becomes steeper than a radial direction and with increasing inclination angles $\alpha 1$ and $\alpha 2$ gets closer to a orthogonal orientation with respect to the axis A which is only possible in special cases.

The inclination angles $\alpha 1$ and $\alpha 2$ can of course also be larger or smaller than shown, either in radial orientation or also in a deviation from the radial orientation and are generally chosen from the interval or range from 0° to 90°, preferably 0° to 60°.

In another embodiment, as shown for instance in FIG. 4, the two outer guiding elements 21 and 23 are inclined in the opposite direction than in FIGS. 2 to 3 at a respective inclination angle $\alpha 3$ or $\alpha 4$ to the axis A, wherein preferably $\alpha 3 = \alpha 4$, but with opposite inclination direction (clockwise and anticlockwise). The inclination is, in this embodiment, chosen such that the longitudinal axes of the guiding elements 21 and 23 or the legs of the inclination angles $\alpha 3$ and $\alpha 4$ intersect the axis A at a point of intersection IP which is on the same side of the orthogonal projection of the respective guiding element 21 or 23 onto the axis A as the centre C1 of the first induction coil 2, in FIG. 4 on the right side towards, at or behind the centre C1, whereas the centre C2 of the second induction coil 2 is on the opposite side of said projection.

If the point of intersection IP is in or coincides with the centre C1, which embodiment is shown in FIG. 4, this results in a radial orientation also of the guiding elements 21 and 23 with respect to C1. This type of arrangement with the guiding elements 21 and 23 radially inclined as shown leads to an optimisation of the magnetic flux of the first induction coil 1, but is not optimal for the second induction coil 2, which makes sense if the first induction coil 1 is larger and has a larger magnetic flux than the second induction coil 2.

However an inclination deviating from a radial direction with respect to C1 may also be advantageous. If the point of intersection IP on the axis A is on the opposite side of the centre C1 than the projection of the guiding element 21 or 23 onto the axis A the inclination is less steep than a radial direction and with decreasing inclination angles $\alpha 3$ and $\alpha 4$ becomes closer to a parallel orientation as shown in FIG. 1 and the flux guidance is more averaged between the two coils 1 and 2. The point of intersection IP on the axis A may also be on the same side of the centre C1 as the projection of the guiding element 21 or 23 onto the axis A the inclination becomes steeper than a radial direction and with increasing inclination angles $\alpha 3$ and $\alpha 4$ gets closer to a orthogonal orientation with respect to the axis A which is only possible in special cases.

The inclination angles $\beta 3$ and $\beta 4$ can of course also be larger or smaller than shown, either in radial orientation or also in a deviation from the radial orientation and are generally chosen from the interval or range from 0° to 90°, preferably 0° to 50°.

So, the inclination of the guiding elements 21 and 23 to the axis A should preferably be in a range from a parallel orientation to the axis A (no inclination, $\alpha 1$, $\alpha 2$, $\alpha 3$ and $\alpha 4$ equal to 0°, no intersecting point IP) up to a radial orientation with respect to one of the centres C1 and C2 of the two overlapping induction coils 1 and 2.

The shapes or rims 10 and 20 of the induction coils 1 and 2 need not be circular as shown, other shapes or rims are possible too such as e.g. elliptic or oval or rectangular or square or spiral shapes or rims, for which shapes a centre and thus a radial direction with respect to the centre are defined.

As FIG. 6 shows, an induction heating arrangement 1000, which is preferably used for or comprised by an induction cooking hob, comprises a, preferably rectangular shaped, in particular square shaped, heating, in particular cooking, area 2000, which is usually covered by a plate 1600, e.g. made of glass ceramics.

The rectangular, in particular square shaped heating, in particular cooking, area 2000 has four quadrants Q1, Q2, Q3 and Q4 the diagonals of which reaching from the centre of the heating area 2000 M to the respective corner being designated by A1, A2, A3 and A4 respectively. In the middle of the heating area a, preferably single, first induction coil 1500 is located having a centre M that preferably is positioned at the centre of the heating area 2000 and preferably being of circular shape with a radius R around the centre M and thus a diameter of 2R.

Preferably in each quadrant Q1 to Q4 an individual respective second induction coil 1100 in Q1, 1200 in Q2, 1300 in Q3 and 1400 in Q4 is arranged, which is preferably of circular shape, the respective coil centres being designated by M1, M2, M3 and M4 and respective coil radii being designated by R1, R2, R3 and R4 respectively. In the embodiment shown all radii R1 to R4 and thus diameters are equal, i.e. the second induction coils are of the same size, however also at least one of them can differ also, for instance two coils, e.g. opposite ones like 1100 and 1300 having one size or diameter and the other two another diameter or radius as is a known configuration in traditional cooking hobs.

Each line going through the centre M or M1 to M4 defines a radial direction for the respective coil.

In this symmetric embodiment shown each centre M1 to M4 of a second induction coil 1100, 1200, 1300 or 1400 coincides with a centre of the respective quadrant and lies, like the centre M of the first induction coil 1500, on the respective diagonal A1 to A4, in fact in its middle, and, further, the diagonals A1 to A4 of the quadrants coincide with or are coaxial with radial directions of the first induction coil 1500 as well as of the respective second induction coil 1100, 1200, 1300 or 1400 in the respective quadrant Q1 to Q4.

As can further be seen, the first induction coil 1500 and each of the second induction coils 1100, 1200, 1300 and 1400 overlap horizontally or in radial directions and, for this reason, are arranged in different planes or at different heights or levels, as will be further apparent from FIG. 2. The inner first induction coil 1500, in its plane, extends further outwardly into to region above or below each of the second induction coils in their respective plane, thus resulting in an overlapping of the coils in a projection orthogonal to their planes. The second induction coil 1100 overlaps with the first induction coil 1500 in an overlapping region (or: area) 1511, The second induction coil 1200 overlaps with the first induction coil 1500 in an overlapping region (or: area) 1511, the second induction coil 1300 overlaps with the first induction coil 1500 in an overlapping region (or: area) 1513 and the second induction coil 1400 overlaps with the first induction coil 1500 in an overlapping region (or: area) 1514.

The radius R or diameter 2R of the inner first induction coil 1500 is chosen larger than the maximum of all radii R1 to R4 of the second induction coils 1100 to 1400 but also smaller than the minimum of all distances of the centre M of the first induction coil 1500 to the centres M1 to M4 of the second induction coils 1100 to 1400. This means that all centres M1 to M4 of the second induction coils 1100 to 1400 lie outside of and are not covered by the first induction coil 1500 and, thus, the overlapping regions 1511 to 1514 cover less than 50% of the area and less than 180° of the angular section of the corresponding second induction coils 1100 to 1400. This allows for the remaining non overlapping areas of more than 50% and angular sections of more than 180° of the second induction coils to be equipped with magnetic flux guiding elements in a conventional manner, preferably in radial direction, as will be explained later.

The second induction coils 1100, 1200, 1300 and 1400 are, thus, arranged in a classical cooking hob pattern occupying quadrants Q1 to Q4 of a rectangular or square shaped cooking area 2000, which is usually covered by a hob plate 1600. Each of these coils and quadrants defines a cooking zone for placing a respective cooking vessel, wherein each cooking zone can be used and controlled separately.

However, in addition to this classical pattern of quadrant cooking zones the first larger induction coil 1500 is provided around the centre of the cooking area stretching or extending out into each of the quadrants thereby overlapping each second induction coil and defining another, here fifth, cooking zone which is larger than the four other cooking zones and allows for larger cooking vessels to be placed onto the plate 2000 in its middle. When the first induction coil 1500 and its larger central cooking zone is operated the other cooking zones are inoperable or not in use, preferably electrically disconnected, at the same time, so that in the overlapping regions undesired effects on the induction field and inductive energy losses are avoided.

However, beside the classical quadrant configuration, any other configuration and number of smaller induction coils surrounding the inner larger induction coil is conceivable as needed at the customer's premises, for instance two or three outer cooking zones or second induction coils with a central larger cooking zone or first induction coil.

Further, it can be seen that in this embodiment, which can also be considered to be a preferred embodiment, guiding elements for the magnetic field lines respectively the magnetic flux are provided associated to respective induction coils.

The induction coil 1100 here has guiding elements 1110, 1120 and 1115. The induction coil 1200 has guiding elements 1210 and 1220. The induction coil 1500 has guiding elements 1510, 1520, 1530 and 1540, whereas the induction coil 1300 has guiding elements 1310, 1315 and 1320. Further, the induction coil 1400 has guiding elements 1409, 1420 and 1407. For the purpose of better visibility, not all of the guiding elements for magnetic flux have been equipped with reference signs. However, at each induction coil, different ones have been referenced so that it is clear that all the induction coils have guiding elements for magnetic field lines that can be referenced.

It further can be observed that outside of the induction coil having a larger diameter 1500, the guiding elements for the magnetic flux of the respective induction coils having a smaller diameter 1100, . . . , 1400 are arranged in a radial pattern or in radial directions. Here, the number of these guiding elements is five, but any other number may be chosen. It can also be seen that these guiding elements 1115, 1110 cover approximately 40% of the radius of the induction coil having a smaller diameter, in particular 35% and especially 45%. On the other hand, in an area of overlap 1700 with the larger induction coil 1500, guiding elements for the magnetic flux 1120, 1220, 1320 and 1410 are arranged in a different pattern. Here, three of them are arranged in parallel to a radial direction in the area of overlap. In particular, by this special pattern, the magnetic field emanated by the induction coil having a larger diameter 1500 can be further focused in the area of the induction coil which allows it to improve the energy efficiency and to increase the number of field lines that enter a pot placed in the area of the induction coil 1500 with a larger diameter. As further is depicted, in the area of the induction coil having a larger diameter 1500, guiding elements for the magnetic flux 1510 to 1540 are provided, while they are placed outside of the area taken by respective induction coils with a smaller diameter 1100, . . . , 1400.

In this manner, the magnetic field emanated by the larger induction coil 1500 can be further homogenized, while at the same time interference between the induction coils having a smaller diameter 1100, . . . , 1400 can be prevented, respectively the magnetic fields emanated by respective smaller induction coils 1100, . . . , 1400 can be focused and confined to the quadrant of the heating arrangement where they are located. It is further shown in the drawing that the guiding elements for the magnetic flux 1510, . . . , 1540 associated to the induction coil with the larger diameter 1500, almost cover 90% of the radius of the larger induction coil respectively, in particular 95%, or more particular 85%. In particular, the induction coils having a smaller diameter have a diameter of 200 mm, more particular 205 mm and most particular 210 mm, whereas the induction coil having a large diameter has a diameter of 275 mm, more particular 280 mm and most particular 285 mm.

Beneficially, the induction coil having a larger diameter 1500 is applied directly in the form of a metallic coating to a glass ceramic plate 1600 supporting the induction heating arrangement.

In FIG. 7 the hob plate, e.g. glass ceramic plate, 1600 can be seen and the larger induction coil 1500 is depicted, which is e.g. applied directly in the form of metal layers structured in form of coil windings to the bottom surface of the hob plate 1600.

On the other hand, the magnetic guiding elements 1540 and 1510 are placed underneath the first induction coil 1500 and also one 1540 is shown here. They may be fixed e.g. be glued to the induction coil 1500 directly. Also, in this view, two second induction coils with a smaller diameter 1400 and 1100 are depicted. It can be observed that the smaller induction coils 1100 and 1400 each overlap with the larger induction coil 1500 and that they are applied directly underneath the large induction coil in order to emanate the magnetic field lines as close as possible to the plate 1600 where the pots are supposed to be placed.

Further, two planes 2100, 2200 are depicted. Each plane houses a respective induction coil/group of induction coils. Plane 2100 here is the plane where the larger induction coil 1500 is located and plane 2200 here is the plane where the four smaller induction coils 1400 to 1100 are located. Further, a selector 2300 is depicted and the energy supply circuitry 2400. Those devices are in a known manner connected to the induction coils 100 to 1500. The purpose of the selector is to disconnect an induction coil located on a respective plane, once an induction coil on another plane is operated. In this manner, less power supply circuitry 2400 is needed in order to supply the induction coils of the respective induction heating arrangement and coupling effects as well as interference are avoided.

Further, guiding elements for magnetic flux 1409, 1407, 1115 on the smaller induction coils are depicted which are fixed to, e.g. glued to, the underside facing away from the first induction coil 1500 of the respective second induction coil 1100 or 1400.

The problem of properly covering the area where the pot is located is solved in a manner of allocating overlapping induction coils to different planes, wherein a larger induction coil 1500 is used to heat larger pots located on the plate 1600, one or more of the smaller induction coils 1100 to 1400 are used to cook in smaller pots located on quadrants of the plate 1600.

Also plural or several induction coils 1100 to 1400 can be grouped together in order to operate neighboring induction coils, e.g. 1100 and 1200, as a common cooking zone to support a lengthy or oblong pot or cooking vessel thereon.

As FIG. 8 shows, the induction hob 3000 comprises an induction heating arrangement 1000 according to the present invention having second induction coils with a smaller diameter 1100 to 1400, a glass ceramic plate 1600 and a first induction coil having a larger diameter 1500.

The induction hob 3000 further comprises a control and display device 3100 for the user to manually control the operation of the induction hob 3000. In particular, the control and display device 3100 may issue user control commands to the selector 2300 and may be allocating power supply circuitry 2400. In particular, the operation of the induction hob 3000 may be controlled in such a manner that once the induction coil having the larger diameter 1500 is operated, at least one, preferably all second induction coils having a smaller diameter 1100, 1200, 1300, 1400 is or are disconnected from the power supply in order to avoid interference respectively coupling in of electromagnetic waves into the smaller coils and heating of the smaller coils by the larger coil. The same takes place for the coil having a larger diameter 1500, once the coils in the second plane 2200 are operated. The control and display device 3100 preferably only allows for a user to select either the first cooking zone and its associated first induction coil 1500 or, alternatively, one or more of the second induction coils 1100 to 1400 as single or combined cooking zones.

As FIG. 8 shows, the method 4000 for operating an induction heating arrangement for e.g. the induction hob 3000 comprises a minimum number of steps 4100, 4200, 4300. At 4100 the method is started, e.g. by a user activating the induction hob 3000. At 4200 it is ensured, that e.g. the induction coils 1100 to 1500 on one of the planes 2100 or 2200 are exclusively operated. The non operated induction coils maybe completely disconnected from power respectively short circuited e.g. by the selector 2300. The number of power supply circuitry can be minimized and the coupling and interference between the coils 1100 to 1500 can be reduced. At 4300 the method is ended, e.g. by a user switching off the induction hob 3000.

LIST OF REFERENCE NUMERALS

1, 2 induction coil
3 overlapping region
11 to 17 guiding elements for magnetic flux
21 to 23 guiding elements for magnetic flux
25 to 29 guiding elements for magnetic flux
1000 induction heating arrangement
1600 support plate
1100, 1200, 1300, 1400 second induction coil
1500 first induction coil
1700 overlapping region
1111 to 1114, 1120 to 1123 guiding elements for magnetic flux
1211 to 1214, 1220 to 1223 guiding elements for magnetic flux
1311 to 1314, 1320 to 1323 guiding elements for magnetic flux
1411 to 1414, 1420 to 1423 guiding elements for magnetic flux
1510, 1520, 1530, 1540 guiding elements for magnetic flux
2000 heating/cooking area
2100 first plane
2200 second plane
2300 selector
2400 power supply
3000 induction hob
3100 control and display device
4000 operation method
4100, 4200, 4300 method steps
r1, r2 radius
A axis
C1, C2 centre
α1, α2, α3, α4 inclination angle
β1, β2 included angle
b width
d, D distance L length
IP intersection point
A1, A2, A3, A4 diagonal
M, M1, M2, M3, M4 centre
Q1, Q2, Q3, Q4 quadrant
R1, R2, R3, R4 radius

The invention claimed is:

1. An induction heating arrangement comprising:
   at least one first induction coil,
   at least one second induction coil,
   the second induction coil partially overlapping with the first induction coil in an overlapping region,
   wherein outside of the overlapping region the first induction coil and the second induction coil are each provided with several respective guiding elements for guiding magnetic flux of the respective induction coil,
   wherein within the overlapping region at least two further guiding elements for guiding the magnetic flux of the first induction coil and/or the second induction coil are arranged,
   at least a first one of the further guiding elements being spaced apart from an axis which runs in a radial direction of the first induction coil as well as in a radial direction of the second induction coil and being oriented or arranged parallel to or inclined to said axis, and
   wherein the guiding elements are arranged or attached below or at an underside of the respective induction coil.

2. The induction heating arrangement according to claim 1,
   wherein at least a second one of the further guiding elements in the overlapping region extends on and along said axis.

3. The induction heating arrangement according to claim 1, wherein there are exactly three further guiding elements in the overlapping region, two of these three further guiding elements being arranged spaced apart from said axis and parallel or inclined to said axis, and one of the three further guiding elements in the overlapping region extending on and along said axis and/or being arranged in between the two of the three further guiding elements.

4. The induction heating arrangement according to claim 3, said two of the three further guiding elements being arranged on opposite sides of said axis.

5. The induction heating arrangement according to claim 1, wherein there are exactly two further guiding elements in the overlapping region both of which are arranged spaced apart from and parallel or inclined to said axis.

6. The induction heating arrangement according to claim 5, each of said two further guiding elements being arranged on opposite sides of said axis.

7. The induction heating arrangement according to claim 1, wherein two first further guiding elements within the overlapping region are inclined at a respective inclination angle to said axis, in opposite inclination directions.

8. The induction heating arrangement according to claim 7, wherein longitudinal axes of the two first further guiding elements or respective legs of their respective inclination angles intersect said axis at the same point of intersection on the same side of an orthogonal projection of the respective guiding element onto said axis as a centre of either the first induction coil or the second induction coil and spaced apart from said centre.

9. The induction heating arrangement according to claim 8, said point of intersection being spaced a larger distance from said orthogonal projection than said centre.

10. The induction heating arrangement according to claim 1, wherein at least one first further guiding element is inclined to said axis and extends in a radial direction of the first induction coil or the second induction coil.

11. The induction heating arrangement according to claim 1, wherein the further guiding elements in the overlapping region are arranged symmetrically to said axis.

12. The induction heating arrangement according to claim 1, wherein guiding elements outside of the overlapping region extend in a respective radial direction of the respective first induction coil or second induction coil.

13. The induction heating arrangement according to claim 1, further comprising a support plate for an object to be heated such as a cooking vessel or cooking good carrier, wherein the first induction coil is arranged on a lower surface of the support plate, and wherein the second induction coils are arranged attached or arranged at a lower surface of the first induction coil.

14. The induction heating arrangement according to claim 13, said first induction coil being applied onto said support plate as a structured layer or as a premanufactured part.

15. The induction heating arrangement according to claim 1, further comprising a selector or control device configured to operate either, in a first operational state, the first induction coil while not operating any of the second induction coils or, in a second operational state, at least one of the second induction coils while not operating the first induction coil.

16. The induction heating arrangement according to claim 1, wherein centres of all said second induction coils lie outside of the first induction coil and/or outside of the overlapping regions, and/or wherein each overlapping region comprises less than 50% and/or less than 180° angular sector of the corresponding second induction coil.

17. The induction heating arrangement according to claim 1, wherein at least two of said second induction coils have the same diameter and/or size, and/or wherein all of the induction coils are of circular shape, and/or wherein at least four of said second induction coils are provided each being arranged in a corresponding quadrant of a rectangular or square shaped heating area defining heating zones and the first induction coil is arranged around a centre of the heating area extending into each of the quadrants and defining another central heating zone.

18. An induction cooking hob comprising the induction heating arrangement according to claim 1.

19. An induction heating arrangement comprising:
   a support plate for an object to be heated;
   a first induction coil having a first diameter, $D_1$, arranged in a first plane beneath the support plate;
   a second induction coil having a second diameter, $D_2$, partially overlapping with the first induction coil in an overlapping region and arranged in a second plane beneath the first plane;
   a plurality of first guiding elements associated with the first induction coil located outside said overlapping region and being oriented radially with and distributed circumferentially about a first center, $C_1$, of said first induction coil for guiding magnetic flux thereof, said plurality of first guiding elements being arranged or attached below or at an underside of said first induction coil;
   a plurality of second guiding elements associated with the second induction coil located outside said overlapping region and being oriented radially with and distributed circumferentially about a second center, $C_2$, of said second induction coil for guiding magnetic flux thereof, said plurality of second guiding elements being arranged or attached below or at an underside of said second induction coil;

a plurality of further guiding elements disposed in said overlapping region, wherein two of said further guiding elements are arranged symmetrically relative to and spaced on opposite sides of an axis extending between said first and second centers, $C_1$ and $C_2$, each of said symmetrically arranged further guiding elements lying at an angle within the range of being radial with the first center, $C_1$ and being radial the second center, $C_2$; and a control device coupled to the first and second induction coils and configured to operate said first induction coil while electrically disconnecting said second induction coil in a first operational state, and to operate said second induction coil while electrically disconnecting said first induction coil in a second operational state;

wherein $D_1$ is greater than $D_2$, and said second center, $C_2$ lies outside of the overlapping region; and wherein said overlapping region is less than 50% of the total area of said second induction coil.

20. The induction heating arrangement according to claim 19, said symmetrically arranged further guiding elements being parallel with said axis.

21. An induction heating arrangement comprising:

a support plate for an object to be heated;

a first induction coil having a first diameter, $D_1$, arranged in a first plane beneath the support plate;

a plurality of second induction coils arranged in a second plane beneath the first plane, each of said plurality of second induction coils having a respective second diameter, $D_2$, and partially overlapping with the first induction coil in a respective overlapping region;

a plurality of first guiding elements associated with the first induction coil located outside said overlapping regions and being oriented radially with and distributed circumferentially about a first center, $C_1$, of said first induction coil for guiding magnetic flux thereof, said plurality of first guiding elements being arranged or attached below or at an underside of said first induction coil;

respective pluralities of second guiding elements associated with each of the plurality of second induction coils located outside the respective overlapping region and being oriented radially with and distributed circumferentially about a second center, $C_2$, of the respective second induction coil for guiding magnetic flux thereof, said respective pluralities of second guiding elements being arranged or attached below or at an underside of the respective second induction coil;

respective pluralities of further guiding elements disposed in each said overlapping region, wherein two of said further guiding elements in each respective plurality thereof are arranged symmetrically relative to and spaced on opposite sides of an axis extending between said first center, $C_1$, and the respective second center, $C_2$, of the respective second induction coil, each of said symmetrically arranged further guiding elements lying at an angle within the range of being radial with the first center, $C_1$ and being radial with the respective second center, $C_2$; and a control device coupled to the first induction coil and to the plurality of second induction coils, and configured to operate said first induction coil while electrically disconnecting said plurality of second induction coils in a first operational state, and to operate said plurality of second induction coils while electrically disconnecting said first induction coil in a second operational state;

wherein $D_1$ is greater than $D_2$, and each respective second center, $C_2$, lies outside of the respective overlapping region; and wherein each said overlapping region is less than 50% of the total area of the respective second induction coil.

22. The induction heating arrangement according to claim 21, comprising four of said second induction coils, each of which being disposed in a respective quadrant of the heating arrangement, said first induction coil being disposed at a center of the heating arrangement.

* * * * *